United States Patent
Tanabe (10) Patent No.: US 10,965,171 B2
(45) Date of Patent: Mar. 30, 2021

(54) POWER SUPPLY APPARATUS, METHOD FOR CONTROLLING THE SAME, AND POWER SUPPLY SYSTEM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 389 days.

(21) Appl. No.: 15/905,001

(22) Filed: Feb. 26, 2018

(65) Prior Publication Data
US 2018/0262061 A1    Sep. 13, 2018

(30) Foreign Application Priority Data

Mar. 9, 2017    (JP) .............................. JP2017-045248

(51) Int. Cl.
| | |
|---|---|
| *H02J 7/00* | (2006.01) |
| *H02J 50/60* | (2016.01) |
| *H02J 7/02* | (2016.01) |
| *H02J 50/20* | (2016.01) |
| *H04B 5/00* | (2006.01) |
| *H02J 50/80* | (2016.01) |

(52) U.S. Cl.
CPC .............. *H02J 50/60* (2016.02); *H02J 7/025* (2013.01); *H02J 50/20* (2016.02); *H02J 50/80* (2016.02); *H04B 5/0037* (2013.01); *H02J 7/00045* (2020.01)

(58) Field of Classification Search
USPC ........................................................ 320/108
See application file for complete search history.

(56) References Cited

U.S. PATENT DOCUMENTS

| 10,418,863 B1* | 9/2019 | Jadidian .................. H02J 50/90 |
| 2007/0279002 A1* | 12/2007 | Partovi .............. G06K 19/0704 320/115 |
| 2012/0043932 A1* | 2/2012 | Nakama .............. H02J 7/00036 320/108 |

(Continued)

FOREIGN PATENT DOCUMENTS

JP    2008-206231 A    9/2008

*Primary Examiner* — Samuel Berhanu
(74) *Attorney, Agent, or Firm* — Cowan, Liebowitz & Latman, P.C.

(57) ABSTRACT

A power supply apparatus of this invention includes a communication unit that performs transmission of power and transmission/reception of information, in a non-contact manner, a plurality of object sensors that are provided on a placing table, and generate object detection signals, a determiner that determines, based on identification information of the electronic device acquired by the communication unit, whether or not the detection signals from the object sensors are within predetermined reference value ranges, a power supply unit that supplies power to the electronic device if it is determined that the detection signals are within the reference value ranges, and a controller that uses signals from object sensors that have not detected placement of the electronic device for detecting extraneous object, and that controls the power supply unit based on whether or not an extraneous object is detected.

13 Claims, 7 Drawing Sheets

(56) References Cited

U.S. PATENT DOCUMENTS

| | | | | |
|---|---|---|---|---|
| 2012/0212070 A1* | 8/2012 | Tanabe | .................... | H02J 5/005 |
| | | | | 307/104 |
| 2012/0242285 A1* | 9/2012 | Jung | ....................... | H02J 50/80 |
| | | | | 320/108 |
| 2013/0193756 A1* | 8/2013 | Fukaya | ................... | H02J 7/025 |
| | | | | 307/29 |
| 2013/0241476 A1* | 9/2013 | Okada | ................... | B60L 53/126 |
| | | | | 320/108 |
| 2013/0285620 A1* | 10/2013 | Yamamoto | .............. | H02J 7/025 |
| | | | | 320/155 |
| 2014/0132210 A1* | 5/2014 | Partovi | ................. | B60L 53/126 |
| | | | | 320/108 |
| 2014/0183978 A1* | 7/2014 | Tanabe | .................... | H02J 50/80 |
| | | | | 307/149 |
| 2015/0177330 A1* | 6/2015 | Morris | .................... | H02J 5/005 |
| | | | | 320/106 |
| 2015/0237664 A1* | 8/2015 | Tanabe | .................... | H04W 4/80 |
| | | | | 455/41.1 |
| 2015/0244201 A1* | 8/2015 | Chu | ........................ | H02J 50/40 |
| | | | | 320/108 |
| 2015/0365138 A1* | 12/2015 | Miller | ................. | A61B 5/0015 |
| | | | | 307/104 |

\* cited by examiner

| SENSOR | NO REACTION VALUE | MEASURED VALUE OF DETECTED DEVICE | REFERENCE VALUE ||||||
|---|---|---|---|---|---|---|---|---|
| | | | CAMERA X (ID:10ABC) ||| CAMERA Y (ID:20XYZ) |||
| | | | a | b | c | a | b | c |
| 114a | 40 | 120 | 110-130 | 110-130 | 110-130 | 200-220 | 200-220 | 200-220 |
| 114b | 41 | 121 | 112-132 | 112-132 | 35-45 | 205-225 | 203-223 | 35-45 |
| 114c | 42 | 42 | 35-45 | 35-45 | 112-132 | 35-45 | 35-45 | 206-226 |
| 114d | 40 | 40 | 35-45 | 109-129 | 109-129 | 35-45 | 204-224 | 204-224 |
| 114e | 41 | 121 | 111-131 | 35-45 | 35-45 | 203-223 | 35-45 | 35-45 |

POWER SUPPLY APPARATUS, METHOD FOR CONTROLLING THE SAME, AND POWER SUPPLY SYSTEM

BACKGROUND OF THE INVENTION

Field of the Invention

The present invention relates to a technique for wirelessly supplying power to an electronic device.

Description of the Related Art

In recent years, power supply systems which include a communication apparatus that transmits power in a non-contact manner without a connection using a connector, and as electronic device that charges a battery mounted therein using power transmitted from the communication unit have been known. Communication apparatuses in such non-contact power supply systems that supply power to electronic devices utilizing the electromagnetic field resonance phenomenon are known. When realizing a communication apparatus that transmits power in a non-contact manner, it is necessary to detect an extraneous object such as a metallic object or a non-standard NFC (Near Field Communication) device, and appropriately control the power supply. Japanese Patent Laid-Open No. 2008-206231 (hereinafter referred to as Patent Document 1) discloses a method of detecting an extraneous object placed on a communication apparatus using a change in load.

Although Patent Document 1 discloses a method of detecting, by the communication apparatus, an extraneous object by the change in load as described above, this method cannot distinguish between a change in load during charging, load modulation communication, or the like, and a change in load due to the intrusion of the extraneous object.

SUMMARY OF THE INVENTION

The present invention provides a technique for detecting an extraneous object independently from a change in the load of a target electronic device to which power is to be supplied wirelessly, and controlling power supply so as not to influence the extraneous object.

According to an aspect of the invention, there is provided a power supply apparatus that wirelessly supplies power to an electronic device placed on a placing table, comprising: a communication unit that performs transmission of power and transmission/reception of information in a non-contact manner; a plurality of object sensors that are provided on the placing table, and generate object detection signals; a determiner that determines, based on identification information of the electronic device that is acquired by the communication unit, whether or not the detection signals from the plurality of the object sensors are within predetermined reference value ranges; a power supply unit that supplies power to the electronic device if it is determined by the determiner that the detection signals are within the reference value ranges; and a controller that uses a signal from, among the plurality of object sensors, an object sensor that has not detected placement of the electronic device as a signal for extraneous object detection, and that controls the power supply unit based on whether or not an extraneous object is detected.

According to the present invention, it is possible to detect an extraneous object independently from a change in the load of a target electronic device to which power is to be supplied, and control power supply so as not to influence the extraneous object.

Further features of the present invention will become apparent from the following description of exemplary embodiments (with reference to the attached drawings).

DESCRIPTION OF THE EMBODIMENTS

In the following, embodiments of the present invention will be described in detail with reference to the accompanying drawings.

System Configuration Diagram

Figure 1:
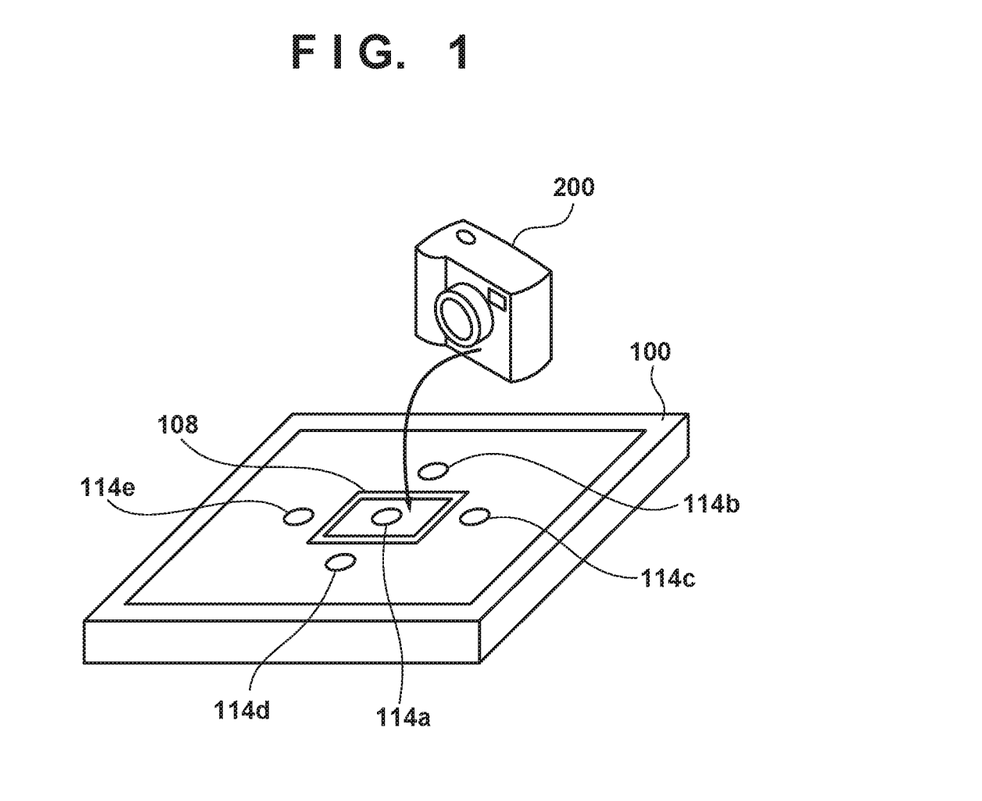
FIG. 1 is a diagram showing an example of a system in the present embodiment.
Figure 2:
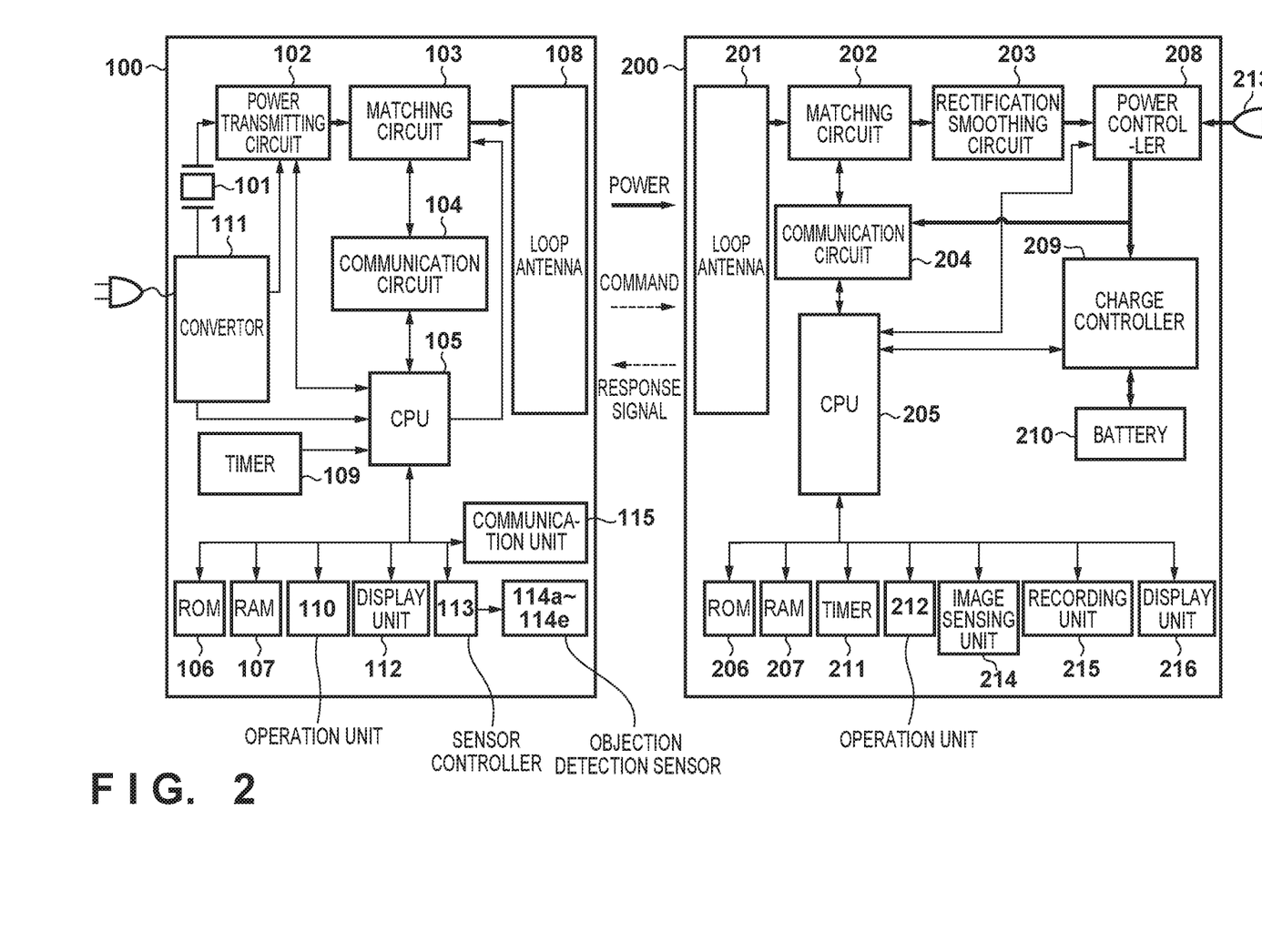
FIG. 2 is a block-configuration diagram of a power supply apparatus (or a communication apparatus) and an electronic device in the present embodiment.

FIG. 1 shows a power supply system according to a first embodiment. This power supply system includes a power supply apparatus 100 that performs power supply in a non-contact manner (wireless power supply) and an electronic device 200 that functions as a receiver of the power. FIG. 2 shows a block configuration of the power supply apparatus 100 and the electronic device 200.

As shown in FIG. 1, if an electronic device 200 is placed on a placing table of a power supply apparatus 100, the power supply apparatus 100 detects the object with a plurality of object sensors housed in the placing table (in the embodiment, shown as five object sensors 114a to 114e), and determines whether or not only the electronic device 200 is placed. If only the electronic device 200 is placed, the power supply apparatus 100 performs communication with and power supply to the electronic device 200 wirelessly via an antenna 108. Also, when the distance between the power supply apparatus 100 and the electronic device 200 is within a predetermined range, the electronic device 200 having an antenna 201 receives power output from the power supply apparatus 100 via the antenna 201 wirelessly. Furthermore, the electronic device 200 charges a battery 210 attached to the electronic device 200 with power received from the power supply apparatus 100 via the antenna 201.

If the distance between the power supply apparatus 100 and the electronic device 200 is not within the predetermined range, the electronic device 200 cannot communicate with the power supply apparatus 100 using the antenna 201. It should be noted that the predetermined range is a range in which the electronic device 200 can communicate using power supplied from the power supply apparatus 100.

Note that the power supply apparatus 100 can also supply power to a plurality of the electronic devices in parallel.

The electronic device 200 may be any electronic device as long as it has a communication unit for receiving power supplied from the battery 210 and for communicating. For example, the electronic device 200 may be an image sensing device such as a smartphone, a digital still camera, a mobile phone with a camera, a digital video camera, or the like, or a reproducing device such as a player that reproduces audio data or video data. In addition, the electronic device 200 may be a moving device such as a vehicle driven by power supplied from the battery 210. Although the electronic device 200 in the embodiment is a digital still camera as shown an FIG. 1, it should be understood that this merely an example. Also, the electronic device 200 may be an electronic device that operates by power supplied from the power supply apparatus 100 when the battery 210 is not attached thereto.

Next, further detailed configuration of the power supply apparatus 100 and the electronic device power supply apparatus 100 includes an oscillator 101, a power transmitting circuit 102, a matching circuit 103, a communication circuit 104, a CPU 105, a ROM 106, a RAM 107, an antenna 108, a timer 109, an operation unit 110, a convertor 111, a display unit 112, a sensor controller 113, and object sensors 114a to 114e.

The oscillator 101 is driven with power supplied from an AC power source (not shown) via the convertor 111, and oscillates at a frequency that is used for controlling the power transmitting circuit 102. Note that the oscillator 101 uses a crystal oscillation element or the like.

The power transmitting circuit 102 generates power to be supplied to the electronic device 200 via the antenna 108, according to power supplied from the convertor 111 and the frequency of oscillation of the oscillator 101. The power transmitting circuit 102 has an FET and the like therein, and generates power to be supplied to the electronic device 200 by controlling the current that flows between the source and drain terminals using the internal FET gate voltage according to the frequency at which the oscillator 101 oscillates. Note that the power generated by the power transmitting circuit 102 is supplied to the matching circuit 103. In addition, the power transmitting circuit 102 can also stop power from the FET by controlling the internal FET gate voltage.

In addition, power that is generated by the power transmitting circuit 102 includes first power and second power.

The first power is power for performing communication for the power supply apparatus 100 to supply, to the electronic device 200, a request to control the electronic device 200. The second power is power to be supplied to the electronic device 200 by the power supply apparatus 100. For example, the first power is 0.1 to 1 W of power, and the second power is 2 to 10 W of power, where the first power is lower than the second power.

Note that when the power supply apparatus 100 is supplying the first power to the electronic device 200, the power supply apparatus 100 can transmit the request to the electronic device 200 via the antenna 108. However, when the power supply apparatus 100 supplies the second power to the electronic device 200, the power supply apparatus 100 cannot transmit a request to the electronic device 200 via the antenna 108.

The CPU 105 controls the power transmitting circuit 102 so as to switch the power to be supplied to the electronic device 200, to one of the first power, the second power, and power stop.

The matching circuit 103 is a resonance circuit that resonates at a resonance frequency f expressed by Expression 1 which is based on the antenna 108 and the capacitor capacitance, according to the frequency at which the oscillator 101 oscillates. Hereinafter, the frequency at which the power supply apparatus 100 and a target device to which the power supply apparatus 100 supplies power resonate with each other is referred to as the "resonance frequency f". Expression 1 below indicates the resonance frequency f. L denotes the inductance of the antenna 108, and C denotes the capacitance of the matching circuit 103.

$$f=1/(2\pi \times (L \times C)^{1/2}) \qquad 1$$

Note that the resonance frequency f may also be 50 or 60 Hz which are commercial frequencies, within the range of 10 to several hundred kHz, or a frequency around 10 MHz.

In the state where the frequency of oscillation of the oscillator 101 is set to the resonance frequency f, power generated by the power transmitting circuit 102 is supplied to the antenna 108 via the matching circuit 103.

The communication circuit 104 modulates power generated by the power transmitting circuit 102, according to a predetermined protocol in order to transmit a request for controlling the electronic device 200, to the electronic device 200. The predetermined protocol is a communication protocol that complies with the ISO/IEC 18092 standard of RFID (Radio Frequency Identification), for example. In addition, the predetermined protocol may be a communication protocol that complies with an NFC (Near Field Communication) standard. Power generated by the power transmitting circuit 102 is converted by the communication circuit 104 into an analog signal as a request for performing communication with the electronic device 200, and is transmitted to the electronic device 200 via the antenna 108.

A pulse signal transmitted to the electronic device 200 is analyzed by the electronic device 200, and thus is detected as bit data including information "1" and information "0". Note that the request includes identification information for identifying the destination, a request code indicating an operation that is instructed by the request, and the like. In addition, the CPU 105 may also transmit a request only to the electronic device 200 by controlling the communication circuit 104 so as to change the identification information included in the request. Moreover, the CPU 105 can also transmit a request to the electronic device 200 and a device other than the electronic device 200 by controlling the communication circuit 104 so as to change the identification information included in the request.

The communication circuit 104 converts power generated by the power transmitting circuit 102 into a pulse signal through ASK (Amplitude Shift Keying) modulation that utilizes amplitude shift. ASK modulation is modulation that utilizes amplitude shift, and is used for communication between an IC card and a card reader that wirelessly communicates with the IC card, and the like.

The communication circuit 104 changes the amplitude of power generated by the power transmitting circuit 102 by switching an analog multiplier and a load resistor that are included in the communication circuit 104. Accordingly, the communication circuit 104 changes power generated by the power transmitting circuit 102 into a pulse signal. The pulse signal obtained by the communication circuit 104 changing the power is supplied to the antenna 108, and is transmitted as a request to the electronic device 200. Furthermore, the communication circuit 104 has a coding circuit that employs a predetermined encoding method. The communication circuit 104 can demodulate, with a decoding circuit, a response from the electronic device 200 that corresponds to the request transmitted to the electronic device 200, and information transmitted from the electronic device 200, according to a change in a current that flows through the antenna 108 detected in the matching circuit 103. Accordingly, the communication circuit 104 can receive, from the electronic device 200, a response to a request transmitted to the electronic device 200 and information that is transmitted from the electronic device 200, using a load modulation method. The communication circuit 104 transmits the request to the electronic device 200 according to the instruction from the CPU 105. Furthermore, if the communication circuit 104 receives a response and information from the electronic device 200, the communication circuit 104 demodulates the received response and information, and supplies the response and information to the CPU 105.

The communication circuit 104 has a register for setting communication, and can adjust the transmission/reception sensitivity during communication, under control by the CPU 105.

When the AC power source (not shown) and the power supply apparatus 100 are connected, the CPU 105 controls the units of the power supply apparatus 100 with power supplied from the AC power source (not shown) via the convertor 111. The CPU 105 also controls operations of the units of the power supply apparatus 100 by executing computer programs stored in the ROM 106. The CPU 105 controls power that is to be supplied to the electronic device 200 by controlling the power transmitting circuit 102. The CPU 105 also transmits a request to the electronic device 200 by controlling the communication circuit 104.

The ROM 106 stores computer programs for controlling operations of the units of the power supply apparatus 100 and information such as parameters regarding the operations of the units. The ROM 106 also records video data to be displayed on the display unit 112.

The RAM 107 is a rewritable volatile memory, and is used as a work area of the CPU 105. Also, the RAM 107 temporarily records computer programs for controlling operations of the units of the power supply apparatus 100, information such as parameters regarding the operations of the units, information received by the communication circuit 104 from the electronic device 200, and the like.

The antenna 108 is an antenna for outputting, to the outside, power generated by the power transmitting circuit 102. The power supply apparatus 100 supplies power to the electronic device 200 via the antenna 108, and transmits a request to the electronic device 200 via the antenna 108. Also, the power supply apparatus 100 receives, via the antenna 108, a request from the electronic device 200, a response corresponding to a request transmitted to the electronic device 200, and information transmitted from the electronic device 200.

The timer 109 measures the current time, and times related to the operation and processing executed by each unit. Threshold values related to the time measured by the timer 109 are recorded in advance in the ROM 106.

The operation unit 110 provides a user interface for operating the power supply apparatus 100. The operation unit 110 has a power button for the power supply apparatus 100, a mode switching button for the power supply apparatus 100, and the like, and those buttons are constituted by a switch, a touch panel, or the like. The CPU 105 controls the power supply apparatus 100 according to an instruction made by a user that has been input via the operation unit 110. Note that the operation unit 110 may be configured to control the power supply apparatus 100 according to a remote-control signal received from a remote controller (not shown).

When the AC power source (not shown) and the power supply apparatus 100 are connected, the convertor 111 converts AC power that is supplied from the AC power source (not shown), into DC power, and supplies the DC power obtained by performing the conversion to the entire power supply apparatus 100.

The display unit 112 is a display unit that displays display content generated by the CPU 105. For example, the display unit 112 is constituted by a liquid crystal panel, an organic EL panel, or the like, and a controller for controlling them.

The sensor controller 113 receives analog signals from the object sensors 114a to 114e arranged on the periphery of the antenna 108. The sensor controller 113 samples a received analog signal at a predetermined sampling frequency, converts the analog signal to a digital signal, and notifies the CPU 105 of the digital signal as digital information. In addition, the sensor controller 113 may also receive a control instruction from the CPU 105, and control validity/invalidity of the object sensors 114a to 114e. Note that the number of the object sensors is not limited to five.

The object sensors 114a to 114e are sensors that detect the presence or absence of an object, and are sensors such as photo reflectors. Object detection information regarding an object detected by the object sensors 114a to 114e is notified to the CPU 105 via the sensor controller 113. If the object sensors are photosensors such as photo reflectors, the object sensors are divided into a light-emitting unit and a light-receiving unit.

A wireless communication unit 115 is a communication unit that can perform wireless communication specified in Ethernet, IEEE802.11a/b/n/ac, or the like. The power supply apparatus 100 can control the wireless communication unit 115 and connect to a network via a router or the like, and acquire information related to the electronic device 200, such as information in which a reference value of a sensor value to be read by the object sensors 114a to 114e is associated with the identification information of the electronic device, and the like.

Next, the configuration of the electronic device 200 will be described. Note that a description will be given below using a digital camera as an example of the electronic device 200.

The electronic device 200 has an antenna 201, a matching circuit 202, a rectification smoothing circuit 203, a communication circuit 204, a CPU 205, a ROM 206, a RAM 207, a power controller 208, a charge controller 209, a battery 210, a timer 211, an operation unit 212, a terminal for an external power source 213, an image sensing unit 214, a recording unit 215, and a display unit 216.

The antenna 201 is an antenna for receiving power supplied from the power supply apparatus 100. The electronic device 200 receives power and receives a request from the power supply apparatus 100 via the antenna 201. Also, the electronic device 200 transmits, via the antenna 201, a request for controlling the power supply apparatus 100, a response corresponding to a request received from the power supply apparatus 100, and predetermined information.

The matching circuit 202 is a resonance circuit for performing impedance matching such that the antenna 201 resonates at the same frequency as the resonance frequency f of the power supply apparatus 100. Similarly to the matching circuit 103, the matching circuit 202 has a capacitor, a coil, a resister, and the like. The matching circuit 202 functions such that the antenna 201 resonates at the same frequency as the resonance frequency f of the power supply apparatus 100. Also, the matching circuit 202 supplies power received by the antenna 201 to the rectification smoothing circuit 203. The matching circuit 202 supplies, to the communication circuit 204, a portion of the power received by the antenna 201 as a request, in the form of an AC wave.

The rectification smoothing circuit 203 removes a request and noise from power received by the antenna 201, and generates DC power. Furthermore, the rectification smoothing circuit 203 supplies the generated DC power to the power controller 208. Note that the rectification smoothing circuit 203 has a rectification diode, and generates DC power through either full-wave rectification or half-wave rectification. The DC power generated by the rectification smoothing circuit 203 is supplied to the power controller 208.

The communication circuit 204 analyzes a request supplied from the matching circuit 202 according to the power supply apparatus 100 and a communication protocol determined in advance, and supplies the result of analyzing the request to the CPU 205.

The CPU 205 controls the communication circuit 204 so as to change ON/OFF of the load of a resister and the like included in the communication circuit 204, in order to transmit, to the power supply apparatus 100, predetermined information and a response to a request transmitted from the power supply apparatus 100 to the electronic device 200, and performs communication using the change as a load modulation signal. When the load included in the communication circuit 204 changes, the current flowing through the antenna 108 changes. Accordingly, the power supply apparatus 100 receives the predetermined information, the response to a request, and a request transmitted from the electronic device 200, by detecting the change in the current flowing through the antenna 108.

Similarly to the communication circuit 104, the communication circuit 204 converts power supplied from the power controller 208 into a pulse signal through ASK modulation that uses amplitude shift, and outputs the pulse signal via the matching circuit 202 and the antenna 201. Also, the communication circuit 204 can receive a load modulation signal in response to a transmitted ASK modulation signal, via the antenna 201 and the matching circuit 202.

The CPU 205 determines the type of request received by the communication circuit 204, according to an analysis result supplied from the communication circuit 204, and controls the electronic device 200 so as to perform processing and operations designated by a request code corresponding to the received request. The CPU 205 returns, via the communication circuit 204, responses to a request for device authentication from the power supply apparatus 100 and a request for acquiring charge information.

In addition, the CPU 205 controls operations of the units of the electronic device 200 by executing computer programs stored in the ROM 206. The ROM 206 stores computer programs for controlling the operations of the units of the electronic device 200 and information such as parameters regarding the operations of the units. Also, the ROM 206 records identification information regarding the electronic device 200, and the like. The identification information of the electronic device 200 indicates the ID of the electronic device 200, and further includes the manufacturer name of the electronic device 200, the device name of the electronic device 200, the manufacture date of the electronic device 200, and the like. The RAM 207 is a rewritable volatile memory, and temporarily records computer programs for controlling operations of units of the electronic device 200, information such as parameters regarding the operations of the units, information transmitted from the power supply apparatus 100, and the like.

The power controller 208 is constituted by a switching regulator or a linear regulator, and supplies DC power supplied from the rectification smoothing circuit 203 or the external power source 213, to the charge controller 209 and the entire electronic device 200. If power is supplied from the power controller 208, the charge controller 209 charges the battery 210 with the supplied power. Note that the charge controller 209 charges the battery 210 using a constant-voltage/constant-current method. Also, the charge controller 209 periodically detects information regarding charging of the mounted battery 210, and supplies the information to the CPU 205. Note that information related to the charge of the battery 210 is hereinafter referred to as "charge information". The CPU 205 records the charge information in the RAM 207.

Note that the charge information may include information indicating whether or not the battery 210 is fully charged, in addition to remaining capacity information indicating the remaining capacity of the battery 210, and may include information indicating the time that has elapsed since the charge controller 209 started charging the battery 210. The charge information may also include information indicating that the charge controller 209 is charging the battery 210 through constant-voltage control, information indicating that the charge controller 209 is charging the battery 210 through constant-current control, and the like. The charge information also includes information indicating that the charge controller 209 is performing software charge control or trickle charging of the battery 210, information indicating that the charge controller 209 is performing quick charging of the battery 210, and the like. The charge information further includes information regarding power required for the electronic device 200 to charge the battery 210, information indicating whether or not the battery 210 is in a dangerous temperature state, and the like. The charge information includes information indicating the battery capacity that is required for operating the electronic device 200. Furthermore, the charge information includes information regarding the consumption of the battery 210 such as information indicating the degree to which the battery capacity will decrease if discharge occurs when power from the communication unit is stopped, and information regarding how many times charging and discharging of the battery 210 has been repeated.

The battery 210 is a battery that can be removed from the electronic device 200. Also, the battery 210 is a chargeable secondary battery, and is a lithium ion battery, for example. The battery 210 can supply power to the units of the electronic device 200. If power is not supplied via the power controller 208, the battery 210 supplies power to the units of the electronic device 200. For example, if the first power during communication that is set to be low is output from the power supply apparatus, or power supply from the power supply apparatus stops, power is supplied from the battery 210 to the units of the electronic device 200.

The timer 211 measures the current time and times regarding operations and processing performed in the units. In addition, threshold values for times that are measured by the timer 211 are recorded in the ROM 206 in advance.

The operation unit 212 provides a user interface for operating the electronic device 200. The operation unit 212 has a power button for operating the electronic device 200, a mode switching button for switching the operation mode of the electronic device 200, and the like, and these buttons are constituted by a switch, a touch panel, or the like. The CPU 205 controls the electronic device 200 in accordance with an instruction made by a user that has been input via the operation unit 212. Note that the operation unit 212 may control the electronic device 200 according to a remote-control signal received from a remote controller (not shown).

The external power source 213 is a power source that changes AC power from an AC power source to DC power, and supplies the DC power. Note that the electronic device 200 in the embodiments operates with power supplied from the battery 210 or the communication unit 100. Accordingly, a description will be given assuming that the external power source 213 is not connected to the electronic device 200.

The image sensing unit 214 is a processing block that has an optical lens, a CMOS sensor, a digital image processing unit, and the like, and converts analog signals that have been input via the optical lens into digital data so as to acquire a shot image. The shot image acquired by the image sensing unit 214 is temporality stored in the RAM 207, and processed based on control by the CPU 205. The shot image is, for example, recorded in a record medium by the recording unit 215. The image sensing unit 214 also has a lens controller, and controls zoom, focus, diaphragm adjustment, and the like based on an instruction from the CPU 205, and notifies the CPU 205 of distance information acquired by converting the position of the lens.

The storing unit 215 is a processing block that is constituted by a recording medium with a large capacity, and stores/reads-out various data into/from the recording media, based on instructions from the CPU 205. The recording media is constituted by an embedded flash memory, an embedded hard disk, a removable/attachable memory card, or the like.

A display unit 216 is constituted by a liquid crystal panel, an organic EL panel, or the like, and displays operation screens, shot images, and the like according to instructions from the CPU 205. The display unit 216 may be configured in a movable form such as a vari-angle screen, and in that case, position information regarding the display unit 216 is converted into digital information, and the CPU 205 is notified thereof.

Note that the antenna 108 and the antenna 201 may be a helical antenna or a loop antenna, or may be a planar antenna such as a meander line antenna.

In addition, in this embodiment, processing performed by the power supply apparatus 100 can also be applied in a system in which the power supply apparatus 100 wirelessly supplies power to the electronic device 200 through electromagnetic field coupling. Similarly, the processing executed by the electronic device 200 in this embodiment can also be applied in a system in which the power supply apparatus 100 wirelessly supplies power to the electronic device 200 through electromagnetic coupling.

In addition, the present invention can also be adopted in a system in which, by providing an electrode serving as the antenna 108 to the power supply apparatus 100, and providing an electrode serving as the antenna 201 to the electronic device 200, the power supply apparatus 100 supplies power to the electronic device 200 through electric field coupling.

Similarly, processing performed by the electronic device 200 and processing performed by the electronic device 200 can also be applied in a system in which the power supply apparatus 100 wirelessly supplies power to the electronic device 200 through electromagnetic induction.

In addition, in this embodiment, the power supply apparatus 100 transmits power wirelessly to the electronic device 200, and the electronic device 200 receives electronic device wirelessly from the power supply apparatus 100. However, "wirelessly" may be reworded to "in a non-contact manner" or "with no contact point".

Figure 3A:
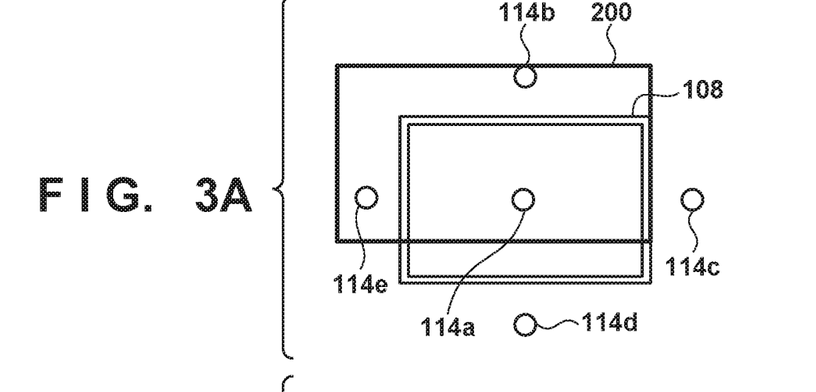
FIGS. 3A to 3C are diagrams showing examples of arrangement of the electronic device relative to a placing table of the power supply apparatus in the present embodiment.
Figure 3B:
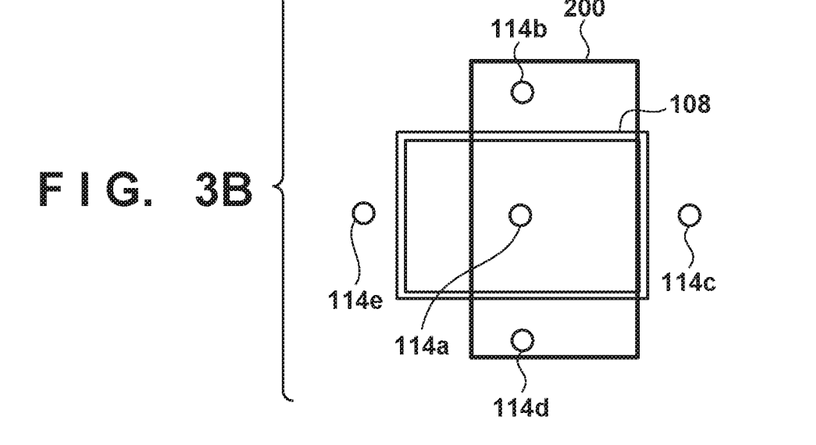
Figure 3C:
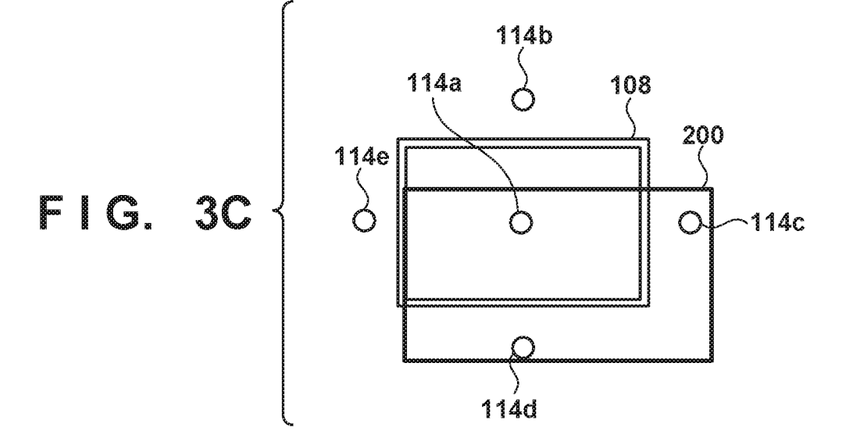

FIGS. 3A to 3C show the arrangement relationship between the antenna 108 and the object sensors 114a to 114e housed in the placing table of the power supply apparatus 100, and a housing of the electronic device 200.

FIG. 3A shows an example of an arrangement in which the electronic device 200 is arranged relative to the antenna 108 of power supply apparatus 100 such that the longitudinal direction of the electronic device 200 is parallel with the longitudinal direction of the antenna 108. As shown in FIG. 3A, the object sensor 114a is arranged in the center of the antenna 108. Furthermore, the object sensors 114b, 114c, 114d, and 114e are arranged around the object sensor 114a. According to the position where the electronic device 200 is placed, the power supply apparatus 100 determines that, compared to a state in which nothing is placed thereon, the sensors that reacted to the placing of the object (the sensor values changed) are the object sensors 114a, 114b, and 114e. Additionally, based on the fact that the sensor values of the object sensors 114c and 114d do not change, the power supply apparatus 100 determines that an object is not placed on the object sensors 114c and 114d.

FIG. 3B shows an example of an arrangement in which the electronic device 200 is arranged on the antenna 108 of power supply apparatus 100 such that the transverse direction of the electronic device 200 is parallel with the longitudinal direction of the antenna 108. According to the position where the electronic device 200 is placed, the power supply apparatus 100 determines that, compared to a state in which nothing is placed thereon, the sensors that reacted to the placing of the object (the sensor values changed) are the object sensors 114a, 114b, and 114d. Additionally, based on the fact that the sensor values of the object sensors 114c and 114e do not change, the power supply apparatus 100 determines that an object is not placed on the object sensors 114c and 114e.

FIG. 3C is another example of arrangement of the electronic device 200 relative to the power supply apparatus 100. According to the position where the electronic device 200 is placed, the power supply apparatus 100 determines that, compared to a state in which nothing is placed thereon, the sensors that reacted to the placing of the object (the sensor values changed) are the object sensors 114a, 114c, and 114d. Additionally, based on the fact that the sensor values of the object sensors 114b and 114e do not change, the power supply apparatus 100 determines that an object is not placed on the object sensors 114b and 114e.

Figure 4:
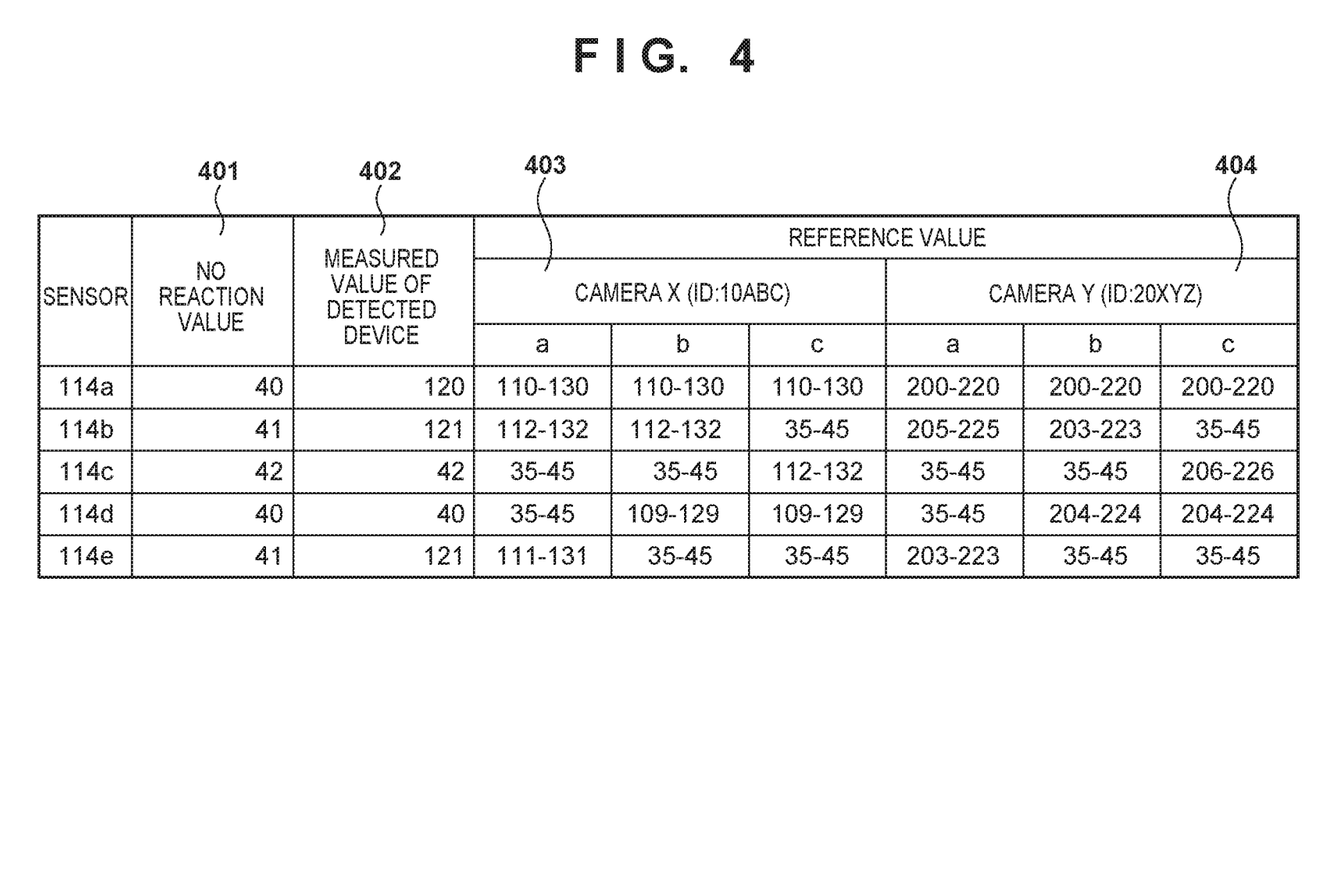
FIG. 4 is a diagram showing a table illustrating a relation between a reference value and a measurement value of the present embodiment.

FIG. 4 shows the relationship between the value of a detection signal (sensor value) from the object sensors 114a to 114e in the arrangements in FIGS. 3A to 3C and the reference values.

As shown in FIG. 4, the correspondence relationship between values of the object sensors and IDs of the cameras is stored as a table in the RAM 107 of the power supply apparatus 100. Note that this table is stored in a rewritable non-volatile memory (not shown) and loaded to the RAM 107.

The values of the object sensors 114a to 114e of the power supply apparatus 100 when nothing is placed are the values described in the column of the values in a field 401 indicating no-reaction. Additionally, the sensor values of the object sensors 114a to 114e when an object is placed are the measurement values shown in a field 402.

The sensor reference values of a camera X 403 and a camera Y 404 are set to any of a value when the camera was previously placed on the power supply apparatus 100, a factory default value, or a value acquired via the communication unit 115.

Reference values "a" for the camera X 403 when the camera X 403 is placed in the arrangement shown in FIG. 3A, for example, are set based on the sensor values when the object sensors 114a, 114b and 114e reacted to the object. In addition, the values of the object sensors 114c and 114d are set with the no-reaction value in the field 401 serving as the reference value. The reference values for the camera X 403 are associated with the ID of the camera X 403: 10ABC, and stored in the RAM 107. Similarly, the reference values of the sensors for the reference values "b" of the camera X 403 when the camera X 403 is placed in the arrangement in FIG. 3B, and the reference values of the sensors for the reference values "b" for the camera X 403 when the camera X 403 is placed in the arrangement in FIG. 3C, are associated with the ID of the camera 403: 10ABC, and stored in the RAM 107.

In the case of the camera Y 404 as well, similarly to the camera X 403, the ID "20XYZ" of the camera 404 is associated with the reference values for the sensors in the arrangements and stored in the RAM 107. Note that the reference values for the sensors when the camera Y 404 is placed in the arrangement in FIG. 3A are shown in the field for the reference values "a" of the camera Y 404, the reference values for the sensors when the camera Y 404 is placed in the arrangement in FIG. 3B are shown in the field for the reference values "b" of the camera Y 404, and the reference values for the sensors when the camera Y 404 is placed in the arrangement in FIG. 3C are shown in the field for the reference values "c" of the camera Y 404.

As shown in FIG. 4, for example, if the measurement values 402 of the detected device are as shown in the table, the reference values of the reference value "a" of the camera X 403 are adopted as the sensor values. Here, the sensor values vary to some extent. Therefore, a positive error ε is defined in the sensor values shown in FIG. 4, and it is determined that a measurement value corresponds to a value in the table as long as the measurement value is within the range of plus or minus ε from the value in the table. Then, if the ID of the electronic device 200 that the power supply apparatus 100 has acquired from the electronic device 200 via communication corresponds to the ID of the Camera X in the table "10ABC", it is determined that the detected device is the camera X 403.

Overall Processing in Power Supply Apparatus 100

Figure 5:
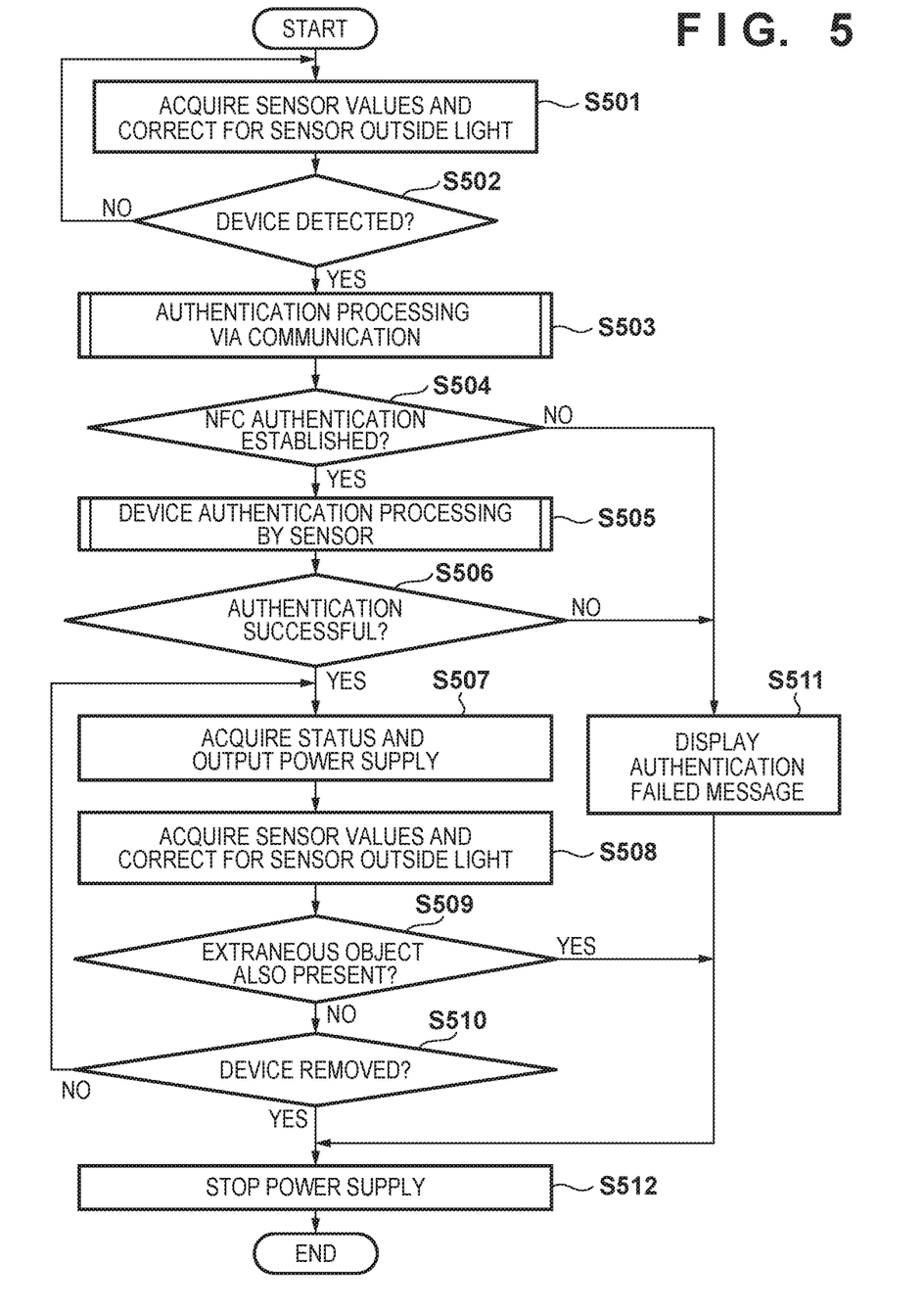
FIG. 5 is a flowchart showing processing of the power supply apparatus of the embodiment.

FIG. 5 shows an example of overall processing in the power supply apparatus 100 in this embodiment. Note that the control program in this flowchart is a program that is stored in the ROM 106, expanded to the RAM 107, and executed by the CPU 105, in a state where the power source of the power supply apparatus 100 is ON. Execution of processing of the control program in this flowchart may be repeated periodically.

In step S501, the CPU 105 controls the sensor controller 113, A/D converts the sensor information that is periodically sent from the object sensors 114a to 114e, and acquires the sensor values. Based on the sensor values X that are acquired by the light-receiving units when the light-emitting units of the object sensors 114a to 114e output light, and sensor values Y that are acquired by the light-receiving units when the light-emitting units of the object sensors 114a to 114e do not output light, the CPU 105 obtains difference values Z for X and Y, and uses the difference values Z as normalized volumes from which the influence of outside light was removed. The CPU 105 completes the processing in step S501, and advances processing from step S501 to step S502.

In step S502, the CPU 105 determines whether or not any device or object is detected based on whether the values of the object sensors 114 change or not even when the influence of external light is removed. Note that the CPU 104 may execute communication via the communication circuit 104, and make the determination based on the presence or absence of a response from the device. In the case of determining that a device or object has been detected, the CPU 105 advances the processing from step S502 to step S503. In the case of determining that no device or object has been detected, the CPU 105 returns the processing from step S502 to step S501.

In step S503, the CPU 105 controls the power transmitting circuit 102 and outputs the first power. For example, as the first power, the CPU 105 outputs the power by which the communication circuit 204 of the electronic device 200 can operate without receiving power supply from the battery 210. The CPU 105 controls the communication unit 104 so as to modulate the outputted first power, transmits a request for detecting the electronic device 200, and receive a response. When inquiring whether or not an NFC device is present or not, for example, if it is Type A, a SENS_REQ request is transmitted, if it is Type B, a SENSB_REQ request is transmitted, and if it is Type F, a SENSF_REQ request is transmitted. Upon transmitting a request, the CPU 105 performs NFC authentication processing by receiving a response to the commands. After performing necessary requests and responses according to the commands, the CPU 105 controls the communication circuit 104 and performs wireless power transmission authentication processing. Specifically, the CPU 105 exchanges various information (ID, compatibility with wireless power transmission, power capability, battery level, presence or absence of a battery) related to wireless power transmission configured in NDEF (NFC Data Exchange Format). The CPU 105 stores the NDEF information for wireless power transmission, which is received in the communication circuit 104, into the RAM 107. After that, the CPU 105 advances the processing from step S503 to step S504.

In step S504, the CPU 105 determines whether or not the authentication of the wireless power transmission has been established. If the CPU 105 determines that the NFC authentication has been established (YES in step S504), the CPU 105 advances the processing from step S504 to step S505. Also, if the CPU 105 determines that NFC authentication has not been established (NO in step S504), the CPU 105 advances the processing from step S504 to step S511.

In step S505, the CPU 105 performs authentication on the device using the sensor values that have been detected by the object sensors 114a to 114e. Details of the processing in this S505 will be described later with reference to FIG. 6. The CPU 105 advances the processing from step S505 to step S506.

In step S506, the CPU 105 determines whether or not the authentication processing using the object sensors 114a to 114e in step S505 was successful. If the CPU 105 determines that the authentication processing using the object sensors 114a to 114e was successful (YES in step S506), the CPU 105 advances the processing from step S506 to step S507. Also, if the CPU 105 determines that the authentication processing using the object sensors 114a to 114e was not successful (NO in step S506), the CPU 105 advances the processing from step S506 to step S511.

In step S507, the CPU 105 acquires the charge information from the electronic device 200 via the communication circuit 104. The CPU 105 determines the appropriate power from the acquired charge information, controls the power transmitting circuit 102, outputs the second power from the antenna 108, and supplies power wirelessly to the electronic device 200. Then, the CPU 105 advances the processing from step S507 to step S508.

In step S508, the CPU 105 acquires the current sensor values from the object sensors 114a to 114e. Note that, similarly to step S501, values from which the influence of outside light has been removed are used as the sensor values. Then, the CPU 105 advances the processing from step S508 to step S509.

In step S509, the CPU 105 determines whether or not an extraneous object is also present using the sensor values from the object sensors 114a to 114e that were acquired in step S508. The CPU 105 determines whether or not an extraneous object is also present or not using the object sensors 114 that have not detected the object (electronic device). For example, if the electronic device 200 is placed as shown in FIG. 3A, the CPU 105 uses the object sensors 114c and 114d as the sensors for detecting extraneous objects. In the case of determining that a sensor value used for detecting extraneous objects been changed (YES in step S509), the CPU 105 displays an alert message on a display 112 indicating that an extraneous object is also present, and advances the processing from step S509 to step S512. If the CPU 105 determines that the sensor values for detecting extraneous objects have not changed (NO in step S509), the CPU 105 advances the processing from step S509 to step S510.

In step S510, the CPU 105 determines whether or not the device has been removed, using the sensor values of the object sensors 114 that were acquired in step S508. The CPU 105 determines the removal of the device using the object sensors 114 that have detected and reacted to the object. If the electronic device 200 is placed as shown in FIG. 3A, for example, the object sensors 114a, 114b and 114e are used as the sensors for detecting the removal of the device in the case of determining that the sensor values for detecting the removal of the device have changed (YES in step S510), the CPU 105 displays an alarm message on the display unit 112 notifying that the device has been removed. Then, the CPU 105 advances the processing from step S510 to step S512. If the CPU 105 determines that the sensor values for detecting the removal of the device have not changed (NO in step S510), the CPU 105 advances the processing from step S510 to step S507, Note that, instead of using the object sensors 114 in step S510, if the CPU 105 determines that communication is not available, it may also be determined that the device has been removed.

In step S511, the CPU 105 displays a message on the display unit 112 for notifying that the authentication has failed. After that, the CPU 105 advances the processing from step S511 to step S512.

In step S512, the CPU 105 controls the power transmitting circuit 102 and stops outputting the second power, and ends this processing. Note that, instead of stopping power, the CPU 105 may also decrease the power to a predetermined level such as the first power, or the like, which is lower than the second power.

Device Authentication Processing by Sensors in Power Supply Apparatus 100

Figure 6:
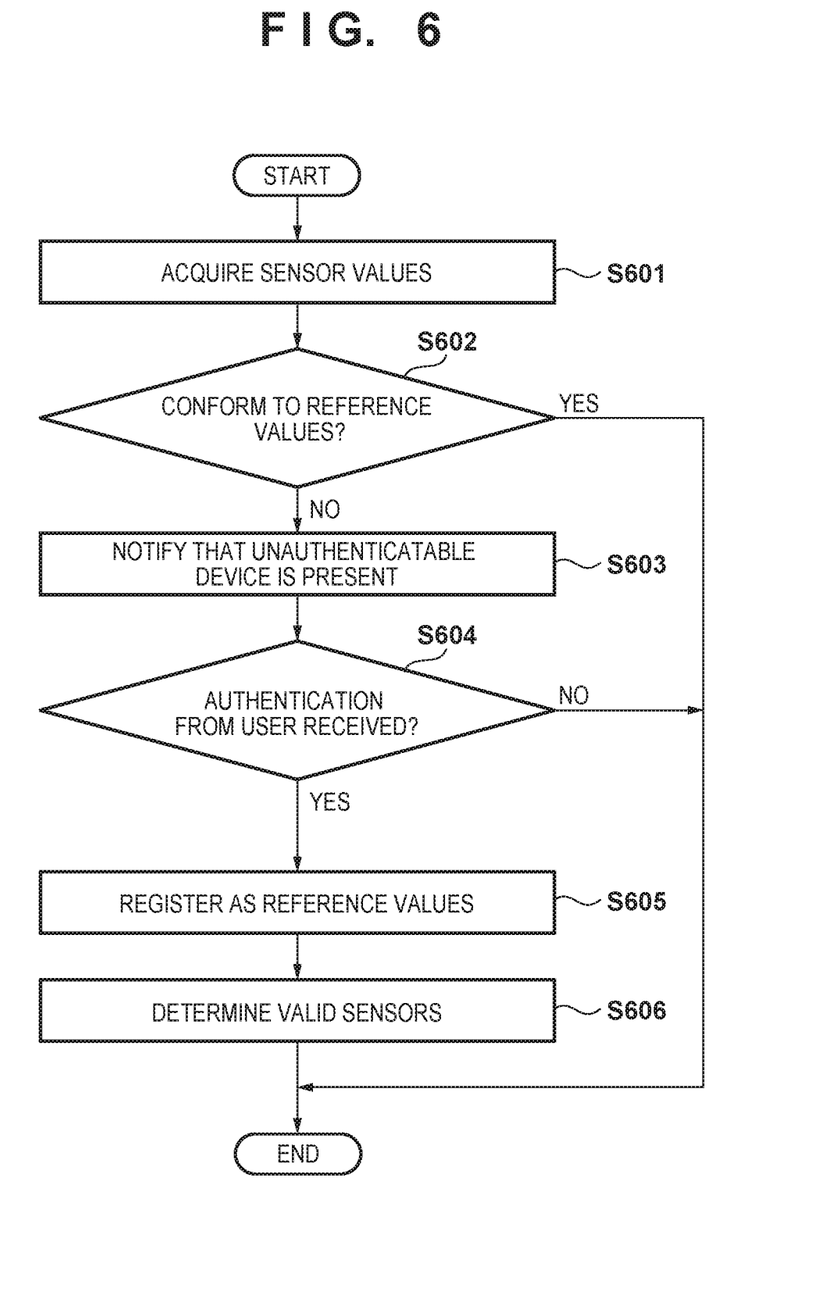
FIG. 6 is a flowchart showing authentication processing performed by the power supply apparatus of the embodiment.

FIG. 6 shows an example of the overall processing in the power supply apparatus 100 in thus embodiment. Note that the control program in this flowchart is a program that is stored in the ROM 106, expanded to the RAM 107, and executed by the CPU 105, in a state where the power source of the power supply apparatus 100 is ON. Execution of processing of the control program in this flowchart may be repeated periodically.

In step S601, similarly to S501, the CPU 105 removes the influence of outside light, and acquires the sensor values from the object sensors 114a to 114e. After that, the CPU 105 advances the processing from step S601 to step S602.

In step S602, the CPU 105 determines if the sensor values of the object sensors 114a to 114e that were acquired in S601 conform to any of the reference values. The CPU 105 determines a camera that corresponds to the ID that was acquired and stored in the RAM 107 in step S504, and determines whether or not the sensor values conform to any of a plurality of reference values for the camera whose ID corresponds thereto. As described using FIG. 4, for example, if the sensor values acquired in step S601 are the measurement values 402 of the detected device, and the ID is "10ABC", it is determined that all the sensor values conform within the reference values a of the camera X 303. In the case of determining that there are conforming reference values among the reference values of the camera whose ID matches (YES in step S602), the CPU 105 stores information indicating that the authentication has been successful in the RAM 107, and ends this processing in step S602. If it determines that there is not a conforming reference value among the reference values of the camera whose ID matches (NO in step S602), the CPU 105 advances the processing from S602 to S603. Note that, due to the step S602, even if the camera X 303 is placed overlapped with an extraneous object, since the measurement value of the object sensor in the place where the extraneous object is placed differs from the value when the camera 303 is placed, the CPU 105 determines that the extraneous object has intruded.

In step S603, if the ID does not conform to the ID held in the RAM 107, the CPU 105 displays a message on the display unit 112 to notify a user that there is a device that cannot be authenticated. Also, the CPU 105 executes a display on the display unit 112 for receiving an authentication instruction (an instruction for permitting the placed electronic device as the device to be charged) from the user via the operation unit 110. Then, the CPU 105 advances the processing from step S603 to step S604.

In step S604, the CPU 105 determines whether or not the authentication instruction has been received from the user via the operation unit 110 within a predetermined period. In the case of determining that the authentication instruction has been received from the user via the operation unit 110 (YES in step S604), the CPU 105 advances the processing from S604 to S605. Also, in the case of determining that the authentication instruction has not been received from the user via the operation unit 110 (NO in step S604), the CPU 105 displays on the display unit 112 that the authentication has failed, stores information indicating that the authentication has failed in the RAM 107, and ends this processing.

In step S605, the CPU 105 stores the values of the object sensors 114 that were acquired in step S601 in association with the ID in the RAM 107. If a buffer assigned in the RAM 107 to store a plurality of reference values associated with the ID is full, the CPU 105 performs processing to delete old reference values. For example, the CPU 105, deletes reference values that are close to each other, the oldest registered reference values, or the reference values that have been least used for the determination by the object sensors. If the reference values that has been least used for the determination by the object sensors are to be deleted, the CPU 105 counts the number of times reference values are applied in S602 as a log and holds it in the RAM 107. The CPU 105 advances the processing in this flowchart from step S605 to step S606.

In step S606, the CPU 105 determines the sensors to be used for the detection of an extraneous object and for device removal. The CPU 105 assigns the object detection sensors 114 whose values have not changed as the sensors to be used to detect an extraneous object. The CPU 105 assigns the object detection sensors 114 whose values have changed as the sensors to be used for device removal. The CPU 105 stores information indicating that the authentication has been successful in the RAM 107, and ends the processing in this flowchart.

Overall Processing in Electronic Device 200

Figure 7:
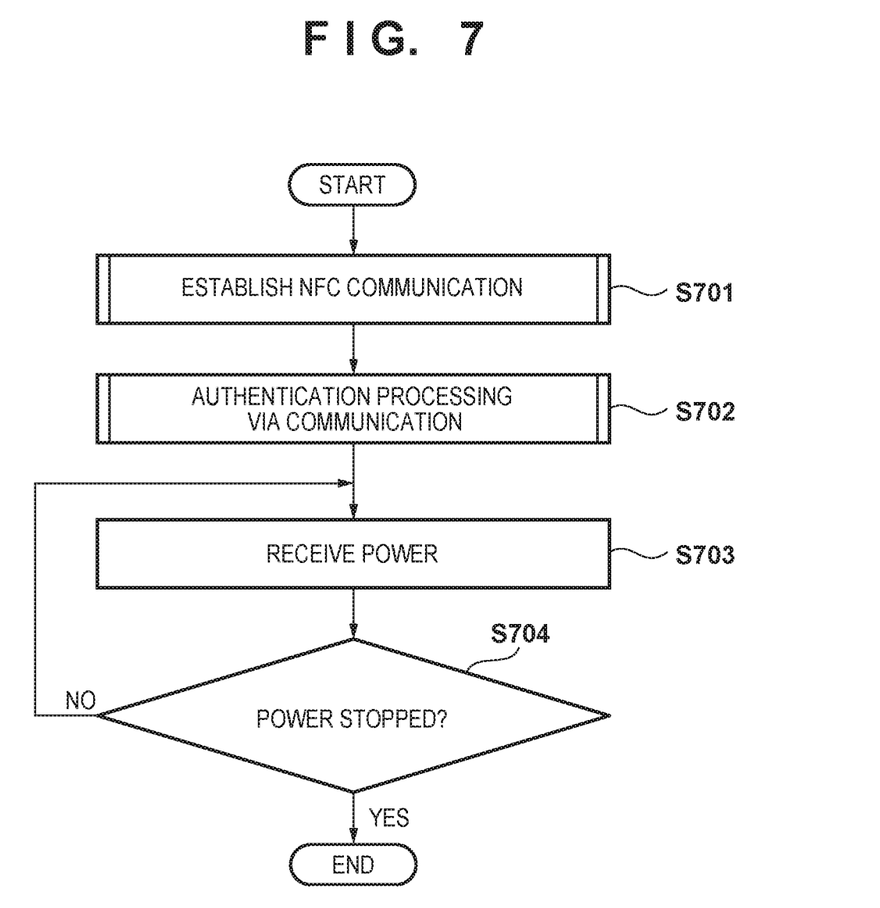
FIG. 7 is a flowchart showing processing of the electronic device of the embodiment.

FIG. 7 shows an example of the overall processing in the electronic device 200 in this embodiment. Note that the control program in this flowchart is a program that is stored in the ROM 206, expanded to the RAM 207, and executed by the CPU 205, in a state where the CPU 205 of the electric device 200 is ON. Execution of processing of the control program in this flowchart may be repeated periodically.

In step S701, the CPU 205 starts NFC authentication processing by controlling the communication circuit so as to receive a carrier signal that has been input via the antenna 201 and the matching circuit 202. The CPU 205 carries out NFC authentication processing by controlling the communication circuit 204 so as to receive a modulation signal superimposed on the received carrier signal, and return a response to each request. For example, a request such as a SENS_REQ request of NFC standard type A, a SENS-B_REQ request of Type B, or a SENSF_REQ request of Type F or the like is received. Upon receiving a request, the CPU 205 controls the communication circuit 204 so as to return, through load modulation, a SENS_RES response as a response to the Type A request, a SENSB_RES response as a response to the Type B request, or a SENSF_RES response as a response to the Type F request. Then, the CPU 205 advances the processing from step S701 to step S702.

In step S702, the CPU 205 controls the communication circuit 204 so as to perform authentication processing for wireless power transmission. Specifically, various types of information regarding wireless power transmission (e.g., whether or not wireless power transmission is supported, power that can be handled, the battery level, and whether or not there is a battery) configured in an NDEF are exchanged. Then, the CPU 205 advances the processing from step S702 to step S703.

In step S703, the CPU 205 uses power supplied from the power supply apparatus 100 to charge the battery 210 via the matching circuit 202, the rectification smoothing circuit 203, the power controller 208, and the charge controller 209. Then, the CPU 205 advances the processing from step S703 to step S704.

In step S704, the CPU 205 determines whether or not power supply from the power supply apparatus 100 is being continued. If the CPU 205 determines that power from the power supply apparatus 100 is being continued (NO in step S704), the CPU 205 returns from step S704 to step S703. Also, in the case of determining that power from the power supply apparatus 100 has stopped (YES in step S704), the processing ends in step S704.

As described above, in the processing in this embodiment, by using a combination of sensor values and communication, even if an NFC device other than the electronic device 200 intrudes partway, the power supply apparatus 100 can perform extraneous object detection. Furthermore, even if the electronic device 200 and the NFC device other than the electronic device 200 are placed simultaneously, it is possible to perform extraneous object detection by the power supply apparatus 100.

Note that the description in this embodiment is merely an example, and the power supply apparatus is not limited to the power supply apparatus 100 that has been described in this embodiment. Also, the electronic device is not limited to the electronic device 200 that has been described in this embodiment. It is also possible to realize the power supply apparatus 100 and the electronic device 200 by a system that is constituted from a plurality of devices, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045248, filed Mar. 9, 2017, which is hereby incorporated by reference herein in its entirety.

What is claimed is:

1. A power supply apparatus that wirelessly supplies power to an electronic device placed on a placing table, comprising:
   a communication unit that performs transmission of power and transmission/reception of information in a non-contact manner;
   a plurality of object sensors that are provided on the placing table, and generate object detection signals;

a storage unit which stores a table associating reference value ranges with identification information of an electronic device, a determiner that determines, based on identification information of the electronic device that is acquired by the communication unit, whether or not the detection signals from the plurality of the object sensors are within predetermined reference value ranges;

a power supply unit that supplies power to the electronic device if it is determined by the determiner that the detection signals are within the reference value ranges; and a controller that uses a signal from, among the plurality of object sensors, an object sensor that has not detected placement of the electronic device as a signal for extraneous object detection, and that controls the power supply unit based on whether or not an extraneous object is detected, wherein the reference value ranges depend on the identification information of the electronic device, wherein the determiner obtains the reference value ranges by referring to the table with the identification information of the electronic device acquired by the communication unit.

2. The apparatus according to claim 1, wherein the determiner makes the determination with reference to the storage unit that stores a table in which the identification information of an electronic device placed on the placing table is associated with values of detection signals from the plurality of object sensors.

3. The apparatus according to claim 2, wherein values of detection signals are stored in the table for respective directions in which the electronic device is placed.

4. The apparatus according to claim 2, further comprising:
a judger that judges whether or not the identification information of the electronic device acquired by the communication unit matches identification information in the table stored in the storing unit, wherein
in a case of a determination that the identification information matches identification information in the table, the power supply unit supplies power for charging a battery of the electronic device.

5. The apparatus according to claim 4, further comprising:
an input unit that, if the judger judges that the identification information of the electronic device acquired by the communication unit does not match any identification information in the table stored in the storing unit, receives an instruction from a user, the instruction indicating whether or not to permit a placed electronic device as a device to receive power supply, wherein
if the input unit received a permitting input, the power supply apparatus supplies power for charging the battery of the electronic device.

6. The apparatus according to claim 1, wherein
if an extraneous object is detected while power for charging is supplied to the electronic device, the controller stops the supply of power to the electronic device, or switches to supply of power lower than the power supplied for charging.

7. The apparatus according to claim 1, wherein
among the plurality of object sensors, the controller determines, as an object sensor for detecting removal of the electronic device, an object sensor that outputs a detection signal indicating presence of the electronic device when supply of power to the electronic device started, and if an object is no longer detected by the determined object sensor, the controller stops the supply of power for charging, or switches to supply of power that is lower than the power supplied for charging.

8. The apparatus according to claim 1, wherein
the communication unit performs transmission of power and transmission/reception of information in a non-contact manner using an antenna housed in the placing table, and
the plurality of object sensors are provided in a periphery of the antenna.

9. The apparatus according to claim 1, wherein
the plurality of object sensors are each a photoreflector.

10. The apparatus according to claim 1, wherein
the communication unit is an NFC (Near Field Communication) communication unit.

11. A method for controlling a power supply apparatus comprising a communication unit that performs, in a non-contact manner, transmission of power to and transmission/reception of information with an electronic device placed on a placing table, a storage unit which stores a table associating reference value ranges with identification information of the electronic device, and a plurality of object sensors that are provided on the placing table and that generate object detection signals, the method comprising:
determining, based on identification information of the electronic device that is acquired by the communication unit, whether or not the detection signals from the plurality of the object sensors are within predetermined reference value ranges;
supplying power to the electronic device if it is determined that the detection signals are within the reference value ranges; and
using a signal from, among the plurality of object sensors, an object sensor that has not detected placement of the electronic device as a signal for extraneous object detection, and controlling the power supply based on whether or not an extraneous object is detected,
wherein the reference value ranges depend on the identification information of the electronic device,
wherein in the determining, the reference value ranges are obtained by referring to the table with the identification information of the electronic device acquired by the communication unit.

12. A non-transitory computer-readable storage medium that stores a program that, by being loaded and executed by a computer that includes a communication unit that performs, in non-contact manner, transmission of power to and transmission/reception of information with an electronic device placed on a placing table, a storage unit which stores a table associating reference value ranges with identification information of the electronic device, and a plurality of object sensors that are provided on the placing table and generate object detection signals, causes the computer to execute steps of a method for controlling a power supply apparatus that supplies power to the electronic device, the method comprising:
determining, based on identification information of the electronic device that is acquired by the communication unit, whether or not the detection signals from the plurality of the object sensors are within predetermined reference value ranges;
supplying power to the electronic device if it is determined that the detection signals are within the reference value ranges; and
using a signal from, among the plurality of object sensors, an object sensor that has not detected placement of the electronic device as a signal for extraneous object detection, and controlling the power supply based on whether or not an extraneous object is detected, wherein the reference value ranges depend on the identification information of the electronic device, wherein in the determining, the reference value ranges are obtained by referring to the table with the identification information of the electronic device acquired by the communication unit.

13. A power supply system constituted by a power supply apparatus that wirelessly supplies power to an electronic device placed on a placing table, a storage unit which stores a table associating reference value ranges with identification information of the electronic device, and the electronic device that receives power from the power supply apparatus, wherein the power supply apparatus comprises:
- a communication unit that performs transmission of power and transmission/reception of information in a non-contact manner;
- a plurality of object sensors that are provided on the placing table, and generate object detection signals;
- a determiner that determines, based on identification information of the electronic device that is acquired by the communication unit, whether or not the detection signals from the plurality of the object sensors are within predetermined reference value ranges;
- a power supply unit that supplies power to the electronic device if it is determined by the determiner that the detection signals are within the reference value ranges; and
- a controller that uses a signal from, among the plurality of object sensors, an object sensor that has not detected placement of the electronic device as a signal for extraneous object detection, and that controls the power supply unit based on whether or not an extraneous object is detected, wherein the reference value ranges depend on the identification information of the electronic device, wherein the determiner obtains the reference value ranges by referring to the table with the identification information of the electronic device acquired by the communication unit.

* * * * *